(12) United States Patent
Alon et al.

(10) Patent No.: US 7,650,526 B2
(45) Date of Patent: Jan. 19, 2010

(54) TRANSMITTER WITH SKEW REDUCTION

(75) Inventors: Elad Alon, Saratoga, CA (US);
Sudhakar Pamarti, Los Angeles, CA (US)

(73) Assignee: Rambus Inc., Los Altos, CA (US)

( * ) Notice: Subject to any disclaimer, the term of this patent is extended or adjusted under 35 U.S.C. 154(b) by 391 days.

(21) Appl. No.: 11/299,073

(22) Filed: Dec. 9, 2005

(65) Prior Publication Data

US 2007/0136621 A1  Jun. 14, 2007

(51) Int. Cl.
*G06F 1/04* (2006.01)

(52) U.S. Cl. .................................. 713/503; 713/400

(58) Field of Classification Search ............... 713/503, 713/400
See application file for complete search history.

(56) References Cited

U.S. PATENT DOCUMENTS

| | | | | |
|---|---|---|---|---|
| 4,084,069 | A | 4/1978 | Looschen | 375/288 |
| 5,160,929 | A | 11/1992 | Costello | 341/57 |
| 5,325,355 | A | 6/1994 | Oprescu et al. | 370/282 |
| 5,740,201 | A | 4/1998 | Hui | 375/286 |
| 5,852,630 | A | 12/1998 | Langberg et al. | 375/219 |
| 5,862,180 | A | 1/1999 | Heinz | 375/244 |
| 6,005,895 | A | 12/1999 | Perino et al. | 375/288 |
| 6,137,455 | A | 10/2000 | Duo | 345/2 |
| 6,154,498 | A | 11/2000 | Dabral et al. | 375/257 |
| 6,222,855 | B1 | 4/2001 | Kimber et al. | 370/466 |
| 6,278,740 | B1 | 8/2001 | Nordyke | 375/257 |
| 6,292,903 | B1 | 9/2001 | Coteus et al. | 713/401 |
| 6,321,282 | B1 | 11/2001 | Horowitz et al. | 710/104 |
| 6,516,365 | B2 | 2/2003 | Horowitz et al. | 710/104 |
| 6,556,628 | B1 | 4/2003 | Poulton et al. | 375/257 |
| 6,573,760 | B1 | 6/2003 | Gabara | 327/65 |
| 6,636,993 | B1 | 10/2003 | Koyanagi et al. | 714/700 |
| 6,643,787 | B1 | 11/2003 | Zerbe et al. | 713/400 |
| 6,646,953 | B1 * | 11/2003 | Stark | 365/233.14 |
| 6,675,272 | B2 | 1/2004 | Ware et al. | 711/167 |
| 6,684,263 | B2 | 1/2004 | Horowitz et al. | 710/8 |
| 6,759,881 | B2 | 7/2004 | Kizer et al. | 327/147 |

(Continued)

OTHER PUBLICATIONS

Dally, W.J., et al., "Digital Systems Engineering," Cambridge University Press, New York, 1998, pp. 366-371.

(Continued)

*Primary Examiner*—Tse Chen
(74) *Attorney, Agent, or Firm*—Morgan, Lewis & Bockius LLP

(57) ABSTRACT

An integrated circuit device is described. The circuit device may include a group of signal nodes, including a first signal node and a second signal node, a transmitter coupled to the group of signal nodes, and a first clock circuit coupled to the transmitter. The transmitter may transmit a first signal on the first signal node and a second signal on the second signal node. The first signal and the second signal may correspond to a first sequence of data bits during a sequence of bit times. The first clock circuit may control a transmit time of at least one of the first signal and the second signal. The first clock circuit may include a first phase adjustment element that provides compensation for a first timing offset between the first signal and the second signal. The first timing offset may be less than a bit time in the sequence of bit times.

23 Claims, 12 Drawing Sheets

U.S. PATENT DOCUMENTS

| | | | | |
|---|---|---|---|---|
| 6,873,939 | B1 | 3/2005 | Zerbe et al. | 702/189 |
| 6,911,853 | B2 | 6/2005 | Kizer et al. | 327/158 |
| 6,920,540 | B2 | 7/2005 | Hampel et al. | 711/167 |
| 6,950,956 | B2 | 9/2005 | Zerbe et al. | 713/400 |
| 6,952,123 | B2 | 10/2005 | Kizer et al. | 327/147 |
| 6,960,948 | B2 | 11/2005 | Kizer et al. | 327/147 |
| 7,190,931 | B2 | 3/2007 | Casper et al. | 455/69 |
| 2002/0181633 | A1* | 12/2002 | Trans | 375/354 |
| 2004/0179638 | A1 | 9/2004 | Yoshikawa | 375/354 |
| 2006/0244505 | A1* | 11/2006 | Fung et al. | 327/293 |

OTHER PUBLICATIONS

Gabara, T., "Phantom Mode Signaling in VLSI Systems," Conf. on Advanced Research in VLSI, Mar. 2001, pp. 88-100.

Krishna, K., et al., "A 0.6 to 9.6 Gb/s Binary Backplane Transceiver Core in 0.13μm CMOS," IEEE Int'l Solid State Circuits Conf., 2005.

Poulton, J.W., et al., "Multiwire Differential Signaling," Technical Paper, University of North Carolina-Chapel Hill, Department of Computer Science, Aug. 2003.

Stonick, J.T., et al., "An Adaptive PAM-4 5-Gb/s Backplane Transceiver in 0.25μm CMOS," IEEE J. of Solid-State Circuits, vol. 38, No. 3, Mar. 2003, pp. 436-443.

Widmer, A.X., et al., "A DC-Balanced, Partitioned-Block, 8B/10B Transmission Code," IBM J. Res. Develp., vol. 27, No. 5, Sep. 1983.

\* cited by examiner

TRANSMITTER WITH SKEW REDUCTION

FIELD OF THE INVENTION

The present invention relates generally to transmitters, and in particular, to transmitters having skew reduction for differential signals on one or more pairs of wires.

BACKGROUND

Many high-speed, chip-to-chip electrical input/output (I/O) interconnects are implemented as differential links. As data rates reach beyond multiple Gb/s (gigabits per second), intra-pair skew, i.e., time of flight differences between signals on one or more pairs of wires that constitute the differential link, may limit the achievable bit-error rate. Intra-pair skew may be associated with mismatches in passive components and/or active devices, as well as wire parasitics. Intra-pair skew may result in received signals that are not truly differential and may reduce a receiver's timing margin.

Intra-pair skew may also pose limits on promising I/O technologies, such as simultaneous common-mode signaling over wires carrying differential data streams (also referred to as phantom signaling). In systems that utilize this type of common-mode signaling, virtual differential signals are created by modulating the common modes of two different differential pairs in a differential manner. Intra-pair skew between signals on a first pair of wires A and A' and/or between signals on a second pair of wires B and B', however, may affect differential signals associated with the difference of signals on the first pair of wires (A-A') and/or the second pair of wires (B-B'). In addition, differences in the average delays of signals on the first pair of wires and/or the second pair of wires may affect the common-mode signals. Existing extraction circuits for the common-mode signals may be sensitive to such effects and may, therefore, compound the challenge posed by intra-pair skew.

Furthermore, existing approaches for adjusting a phase of a sampling clock at a receiver on a pair-of-wire basis may not be effective in reducing the effects of intra-pair skew. Even if the phase of the sampling clock at the receiver is adjusted on a per-wire basis it may not be effective in reducing the effects of intra-pair skew, since such adjustments may not render received signals differential. As a consequence, there is a need for improved devices, systems and methods to address intra-pair skew and improved common-mode signaling.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
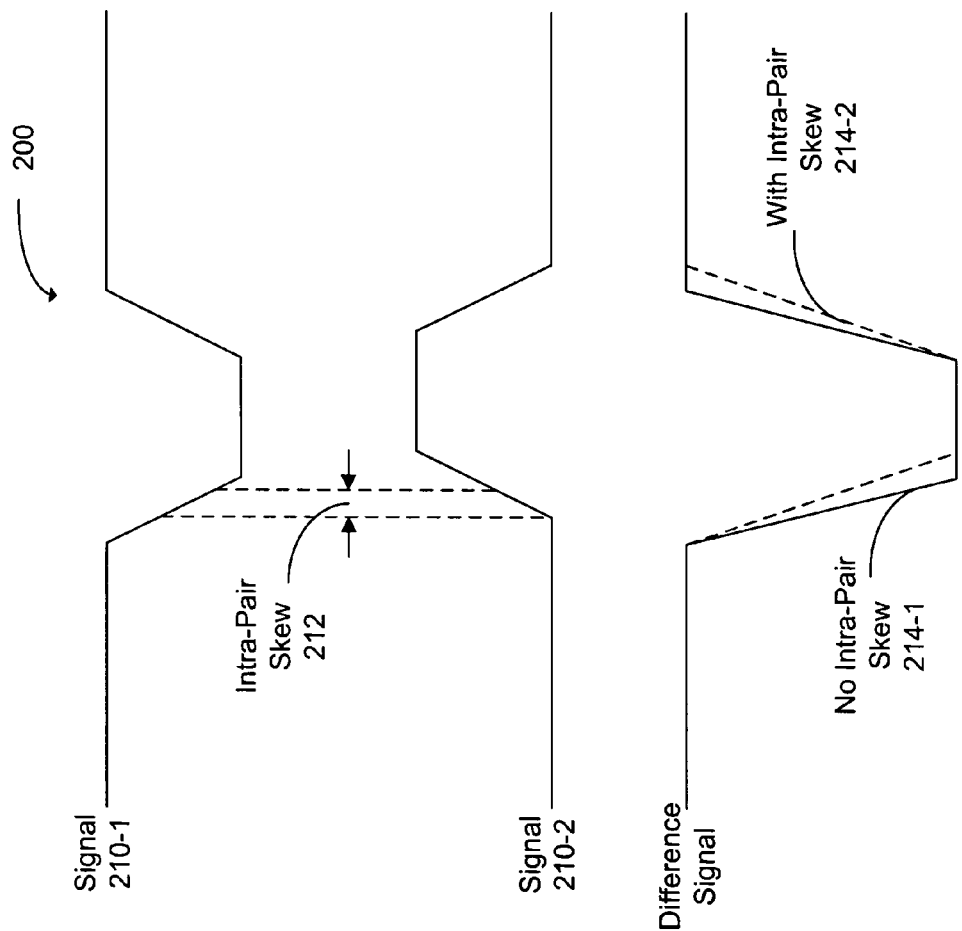
FIG. 1 is a block diagram illustrating intra-pair skew.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of an integrated circuit or signaling device are described. The signaling device may reduce and/or eliminate (henceforth referred to as compensate for) one or more timing offsets or phase mismatches, such as intra-pair skew, between differential signals on one or more pairs of wires or signal lines. This may be accomplished using one or more adjustments performed at a transmitter. For example, by adjusting one or more transmit times of the differential signals using one or more clock circuits each having a phase adjustment element and/or using one or more integer delay elements coupled to one or more data input lines. The one or more clock circuits may compensate for one or more timing offsets that are less than a bit time in a sequence of bit times. The transmitter may include one or more single-ended drivers and/or one or more differential drivers.

The transmitter may be coupled to a receiver. The receiver may include one or more differential receivers. The one or more differential receivers may sample signals on two or more signal lines in accordance with one or more sampling clocks. The one or more differential receivers may also extract signals whose value represents or is indicative of a difference of signals on two or more signal lines. One or more phase adjustment elements in the receiver may allow the sampling clock to be adjusted.

A back channel or communications line may couple feedback information from one or more outputs of the receiver to the transmitter. The information may be used to determine intra-pair skew signals on one or more pairs of signal lines. Phase adjustment control logic may be used to adjust the adjustment elements in one or more of the clock circuits. In an alternate embodiment, the phase adjustment elements in one or more of the clock circuits may be adjusted in accordance with pre-determined values. The pre-determined values may correspond to a topography of one or more circuits or signal lines in the signaling device, characterization of the signaling device (such as testing in a factory), and/or a desired mean or average set-point for one or more of the phase adjustments. In some embodiments, a respective phase adjustment element may be implemented using a phase interpolator or a delay element.

The transmitter may drive single-ended and/or differential signals on a first pair of signal lines and a second pair of signal lines. The transmitter may also drive common-mode signals on the first pair or signal lines and the second pair of signal lines. The receiver may detect or determine three data bits on a group of four signal lines during each bit time of the sequence of bit times. A first bit in the three bits may be determined by a first differential receiver using the differential signals on the first pair of signal lines. A second bit in the three bits may be determined by a second differential receiver using the differential signals on the second pair of signal lines. A third bit in the three bits may be determined using the common-mode signals on the first pair of signal lines and the second pair of signal lines. In some embodiments, the third bit may be determined using one or more analog common-mode extractor circuit. In some embodiments, the third bit may be determined using a third and a fourth differential receivers. A respective differential receiver of the third and the fourth differential receivers may be coupled to a respective signal on one of the signals lines in the first pair of signal lines and a respective signal on one of the signals lines in the second pair of signal lines. Outputs from the third and the fourth differential receivers may be coupled to a logic circuit. The logic circuit may determine the third bit in accordance with a control signal that may be determined from the output of the first differential receiver and the output of the second differential receiver.

In an alternate embodiment, three data bits on the group of four signal lines during each bit time of the sequence of bit times may be transmitted using three differential drivers or six single-ended drivers and received using four differential receivers coupled to digital logic.

The signaling device may reduce or eliminate intra-pair skew for signals on two or more pairs of signal lines and/or improve common-mode-signaling using groups of four signal lines.

By digitally receiving the common mode signals, the signaling device may be less sensitive to mismatches between passive components and/or active devices. The embodiments of the signaling device discussed below may also be less sensitive to effects such as intra-pair skew.

FIG. 1 is a block diagram 200 illustrating intra-pair skew. Signals 210, which may be differential signals, may develop a timing offset between them due to transmit timing errors, parasitic impedances on one or more signal lines, and/or different propagation times for signals on different signal lines or for different types of signals. For example, some circuits may have different relative impedances, and thus different average delay times or phases, for common-mode signals on two pairs of signal lines than for differential signals on one of the two pairs of signal lines. Collectively, such timing offsets are referred to as intra-pair skew 212. When the difference of the signals 210 is determined (for example, in one of the differential receivers 118 in FIG. 1A) to produce a difference signal, a presence 214-2 or absence 214-1 of intra-pair skew 212 may result in one or more timing offsets and/or changes in one or more transitions corresponding to one or more bits in the sequence of bits.

The intra-pair skew 212 may reduce a timing margin and, therefore, reduce overall performance (such as the bit error rate) of a communications system. Such limitations may reduce an effective data rate for transmitting and receiving bits in the sequence of bits, including bits communicated using common-mode signaling. As mentioned previously, adjusting a sampling time in a receiver, such as one of the differential receivers 118 (FIG. 1A), may not be effective in reducing or eliminating the effects of intra-pair skew 212 since the underlying distortions in the signals occur when the signals are transmitted and/or transported along one or more signal lines, i.e., prior to when the signals are received.

Attention is now directed towards embodiments of the signaling device. The following embodiments may address the challenge imposed by intra-pair skew 212 through adjustment of one or more transmit times in one or more transmitters. The adjustment may compensate for one or more timing offsets for a respective wire or signal line, or for a respective pair of wires or signal lines. Thus, the adjustment may reduce or eliminate a phase mismatch between two signals at a receiver. The one or more transmitters may be single-ended or differential. The adjustment may be less than a bit time corresponding to bits in the sequence of bits and/or an integer multiple of the bit time. One or more receivers of one or more adjusted signals on signal lines may be differential receivers. In some embodiments, the one or more transmit times may be adjusted and one or more sampling clocks in the one or more receivers may be adjusted. The adjustment, at the one or more transmitters and/or the one or more receivers, may be applied to differential signals on a respective pair of signal lines and/or common-mode signals on two or more pairs of signal lines. The adjustment may be pre-determined (for example, based on a topography and/or testing or characterization at a factory) and/or may be in accordance with feedback information from one or more receivers using a back channel or separate communications link between the one or more receivers and the one or more transmitters. The feedback information may be used to train and/or determine one or more adjustment values.

Figure 2A:
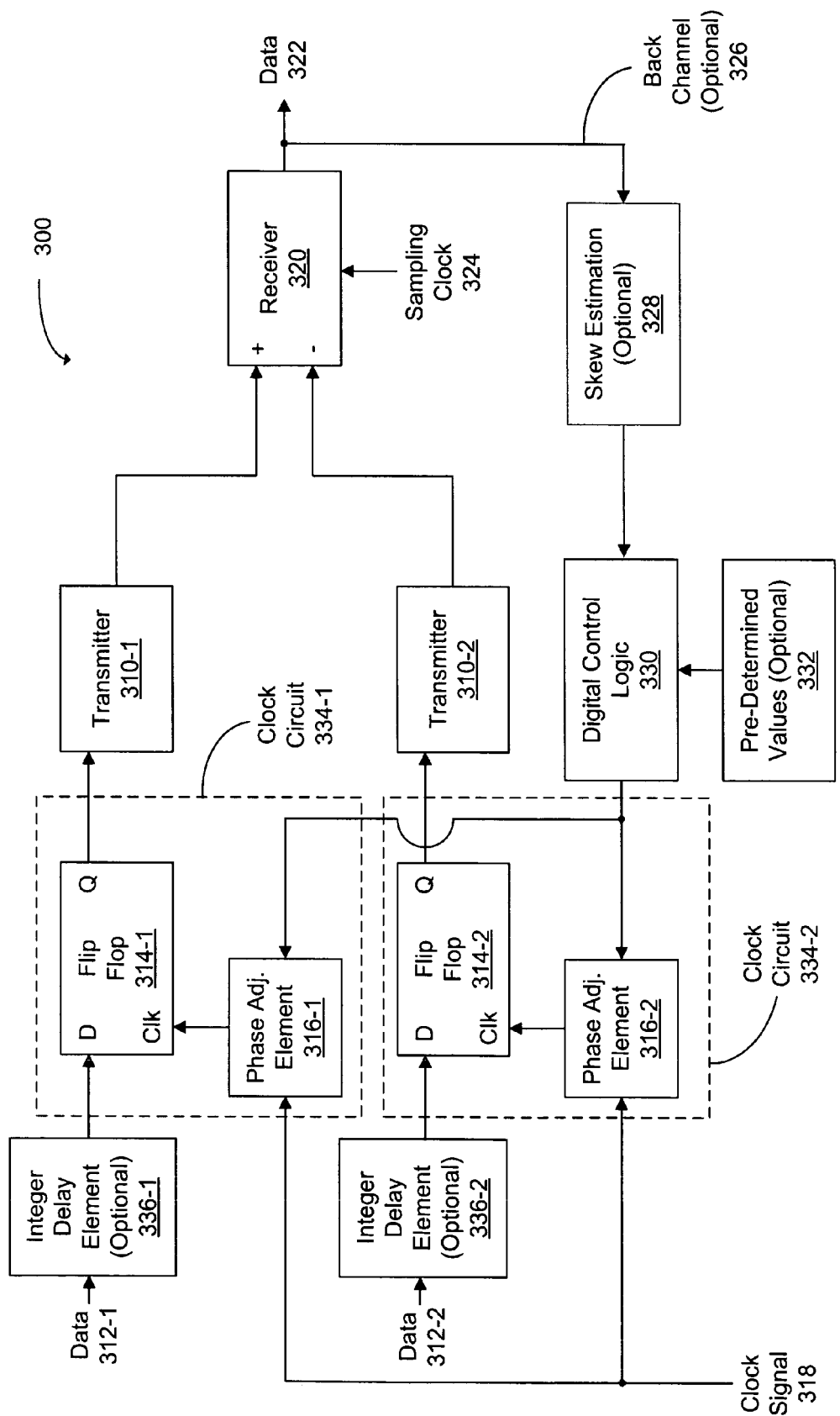
FIG. 2A is a block diagram illustrating an embodiment of a signaling system.

FIG. 2A is a block diagram illustrating an embodiment of a signaling system 300. Data 312 may be coupled to optional integer delay elements 336 and to clock circuits 334. The clock circuits 334 may include flip-flops 314 and phase adjustment elements 316. The phase adjustment elements 316 may be coupled to clock signal 318. The clock signal 318 may be generated by a clock circuit (not shown) that includes a reference oscillator, a phase locked loop and/or a delay locked loop. Outputs from the clock circuits 334 may be coupled to single-ended transmitters 310. Outputs from single-ended transmitters 310-1 and 310-2, which together may be differential data signals, may be received by a differential receiver 320 in accordance with a sampling clock 324. The sampling clock 324 may be generated by an additional clocking circuit (not shown). The differential receiver 320 may output data 322. An output from the differential receiver 320 may be coupled via an optional communications link or back channel 326 to optional skew estimation 328 circuitry. Delay control logic 330 may be coupled to an output from the optional skew estimation 328 circuitry and/or to optional pre-determined values 332.

The delay control logic 330 may adjust a respective transmit time of the single-ended transmitter 310-1 and/or the single-ended transmitter 310-2 by adjusting phase adjustment element 316-1 and/or phase adjustment element 316-2. Phase adjustment elements 316 may be used to delay the transmit time of either data 312-1 or data 312-2 by an amount of time that is less than one bit time (or one symbol time) of the sequence of bits in data 312-1 or 312-2. In some embodiments of the signaling system 300 and/or the additional embodiments described below, the delay control logic 330 may be used to adjust one or more of the optional integer delay elements 336. While phase adjustment element 316-1 or phase adjustment element 316-2 may be used to delay data 312-1 or 312 by less than one bit time, optional integer delay element 336-1 or optional integer delay element 336-2 may be used to provide additional delays that are an integer multiple of the bit time in the sequence of bits. The optional integer delay elements 336 may be implemented using a first-in-first-out (FIFO) buffer or flip-flops.

By adjusting transmit times of the single-ended transmitter 310-1 and/or the single-ended transmitter 310-2, the signal system 300 may compensate for timing offsets, such as intra-pair skew, between signals output from the single-ended transmitter 310-1 and the single-ended transmitter 310-2.

The signaling system 300 may include fewer or additional components. For example, in some embodiments only one of the clock circuits 334 may have a phase adjustment element, such as the phase adjustment element 316-1. However, such embodiments may have difficulty in adjusting positive and negative relative timing offsets between signals output from the single-ended transmitter 310-1 and the single-ended transmitter 310-2. While the signaling system 300 is illustrated with two single-ended transmitters 310 and two signal lines, in other embodiments there may be one or more additional single-ended or differential transmitters and signal lines. In other embodiments, the single-ended transmitters 310 may be replaced by a differential transmitter. In some embodiments, positions of one or more components may be changed. Two or more components may be combined into a single component. Functions of one or more components may be implemented using one or more other components.

Figure 2B:
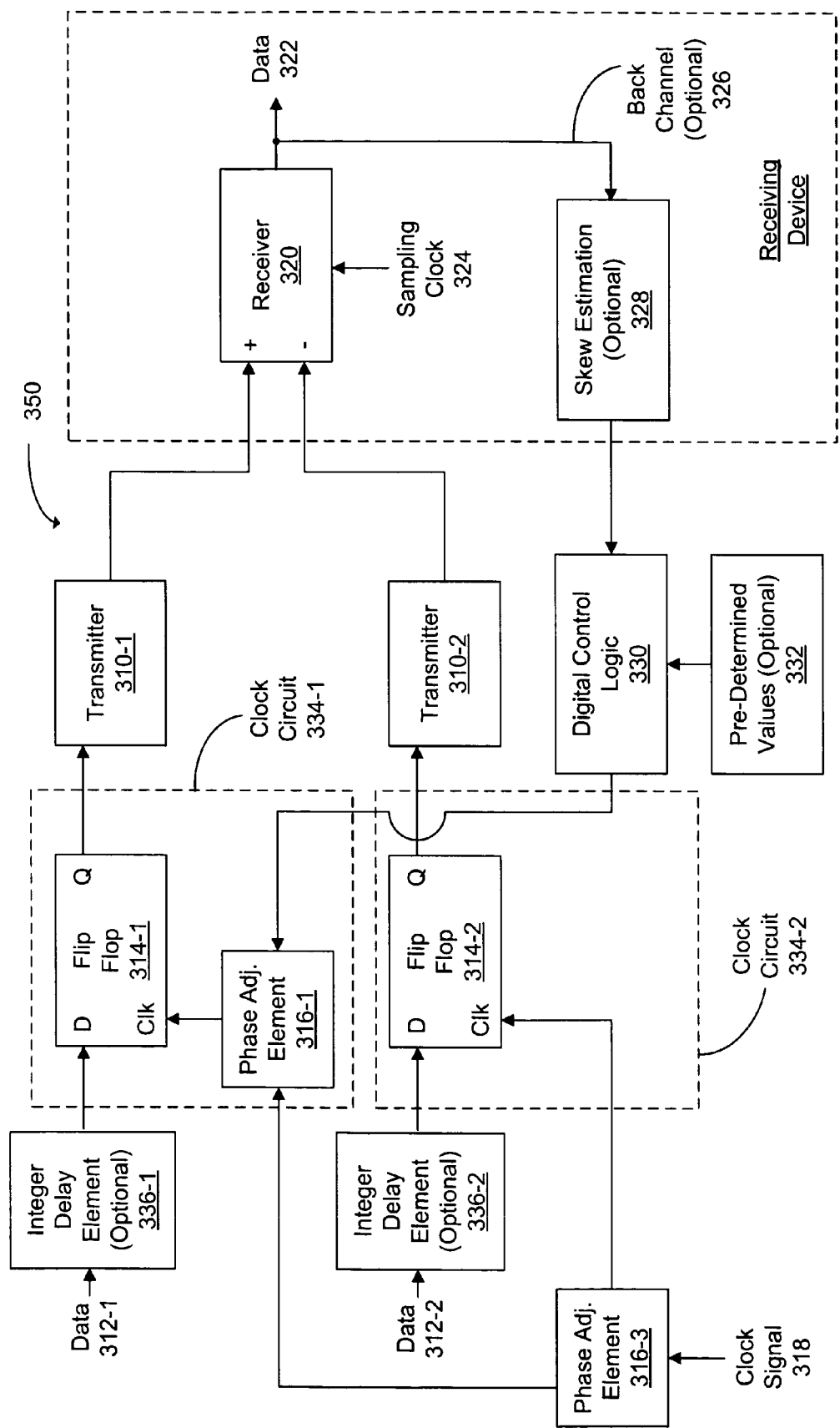
FIG. 2B is a block diagram illustrating an embodiment of a signaling system.

FIG. 2B is a block diagram illustrating an embodiment of a signaling system 350. In the signaling system 350, clock circuit 334-1 may have the phase adjustment element 316-1 while clock circuit 334-2 may not have a phase adjustment element. The phase adjustment element 316-1 and/or one or more of the optional integer delay elements 336 may be used to compensate for timing offsets. Phase adjustment element 316-3 may be used to perform per bit timing calibration or adjustment of bits in sequences of bits corresponding to the data 312. This is also referred to as flex phase. The per bit timing calibration may, for example, be used to modify sampling times in the receiver 320. Alternatively, the sampling times in the receiver may be adjusted by modifying the sampling clock 324 (for example, using a phase locked loop or a delay locked loop). In other embodiments, the sampling times may be adjusted by adjusting the sampling clock 324 and/or the phase adjustment element 316-3. This is illustrated below in FIGS. 4A and 4B.

The signaling system 350 may include fewer or additional components. While the signaling system 350 is illustrated with two single-ended transmitters 310 and two signal lines, in other embodiments there may be one or more additional single-ended or differential transmitters and signal lines. In other embodiments, the single-ended transmitters 310 may be replaced by a differential transmitter. In some embodiments, positions of one or more components may be changed. Two or more components may be combined into a single component. Functions of one or more components may be implemented using one or more other components.

Figure 3A:
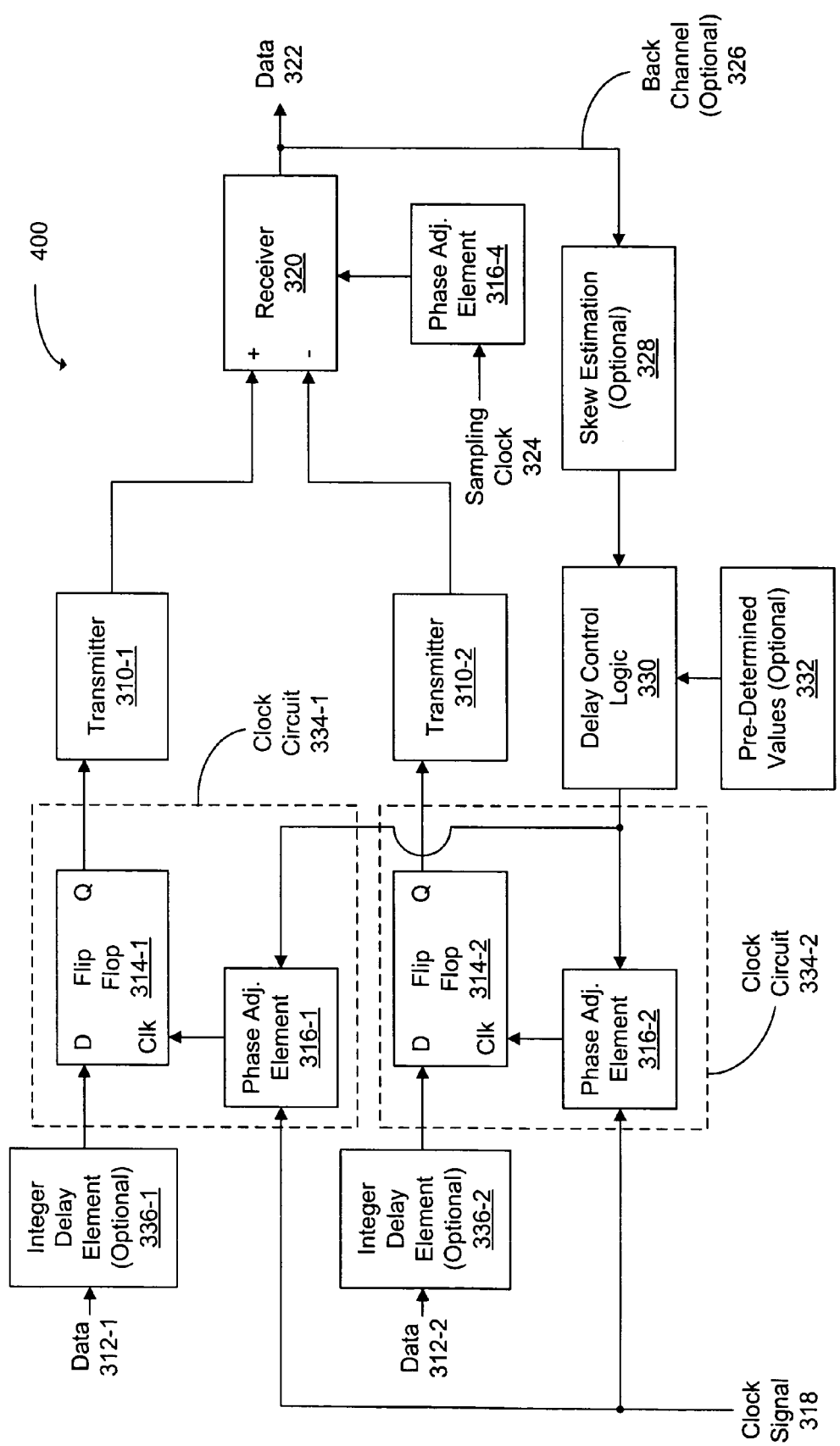
FIG. 3A is a block diagram illustrating an embodiment of a signaling system.

FIG. 3A is a block diagram illustrating an embodiment of a signaling system 400. The signaling system 400 may include a phase adjustment element 316-4 for adjusting the sampling times in the receiver 320. The signaling system 400 may include fewer or additional components. While the signaling system 400 is illustrated with two single-ended transmitters 310 and two signal lines, in other embodiments there may be one or more additional single-ended or differential transmitters and signal lines. In other embodiments, the single-ended transmitters 310 may be replaced by a differential transmitter. In some embodiments, positions of one or more components may be changed. Two or more components may be combined into a single component. Functions of one or more components may be implemented using one or more other components.

Figure 3B:
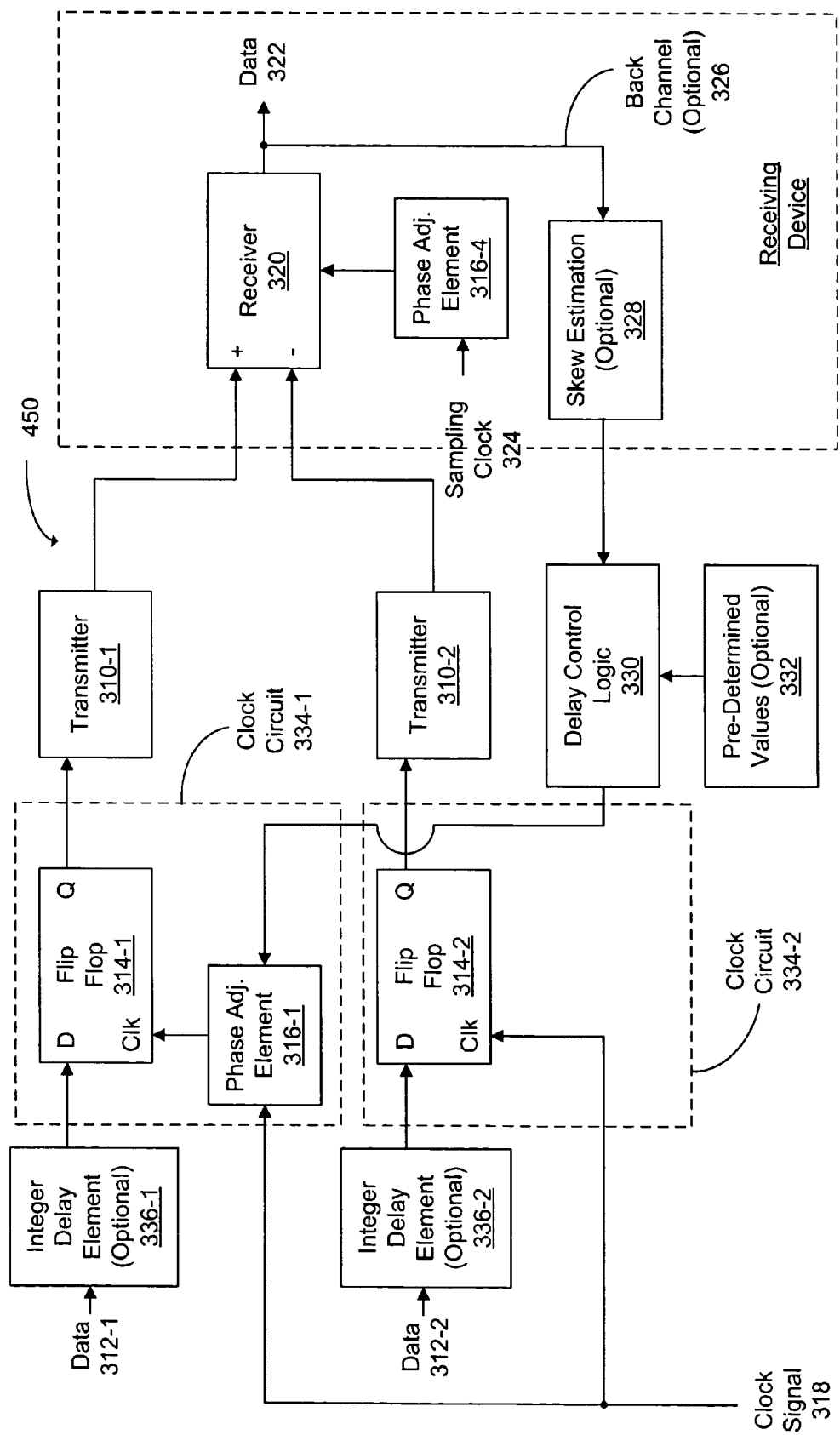
FIG. 3B is a block diagram illustrating an embodiment of a signaling system.

FIG. 3B is a block diagram illustrating an embodiment of a signaling system 450. The signaling system 450 may include the phase adjustment element 316-4 for adjusting the sampling times in the receiver 320. In the signaling system 450, clock circuit 334-1 may have the phase adjustment element 316-1 while clock circuit 334-2 may not have a phase adjustment element. The phase adjustment element 316-1 and/or one or more of the optional integer delay elements 336 may be used to compensate for timing offsets. The signaling system 450 may include fewer or additional components. While the signaling system 450 is illustrated with two single-ended transmitters 310 and two signal lines, in other embodiments there may be one or more additional single-ended or differential transmitters and signal lines. In other embodiments, the single-ended transmitters 310 may be replaced by a differential transmitter. In some embodiments, positions of one or more components may be changed. Two or more components may be combined into a single component. Functions of one or more components may be implemented using one or more other components.

Figure 4A:
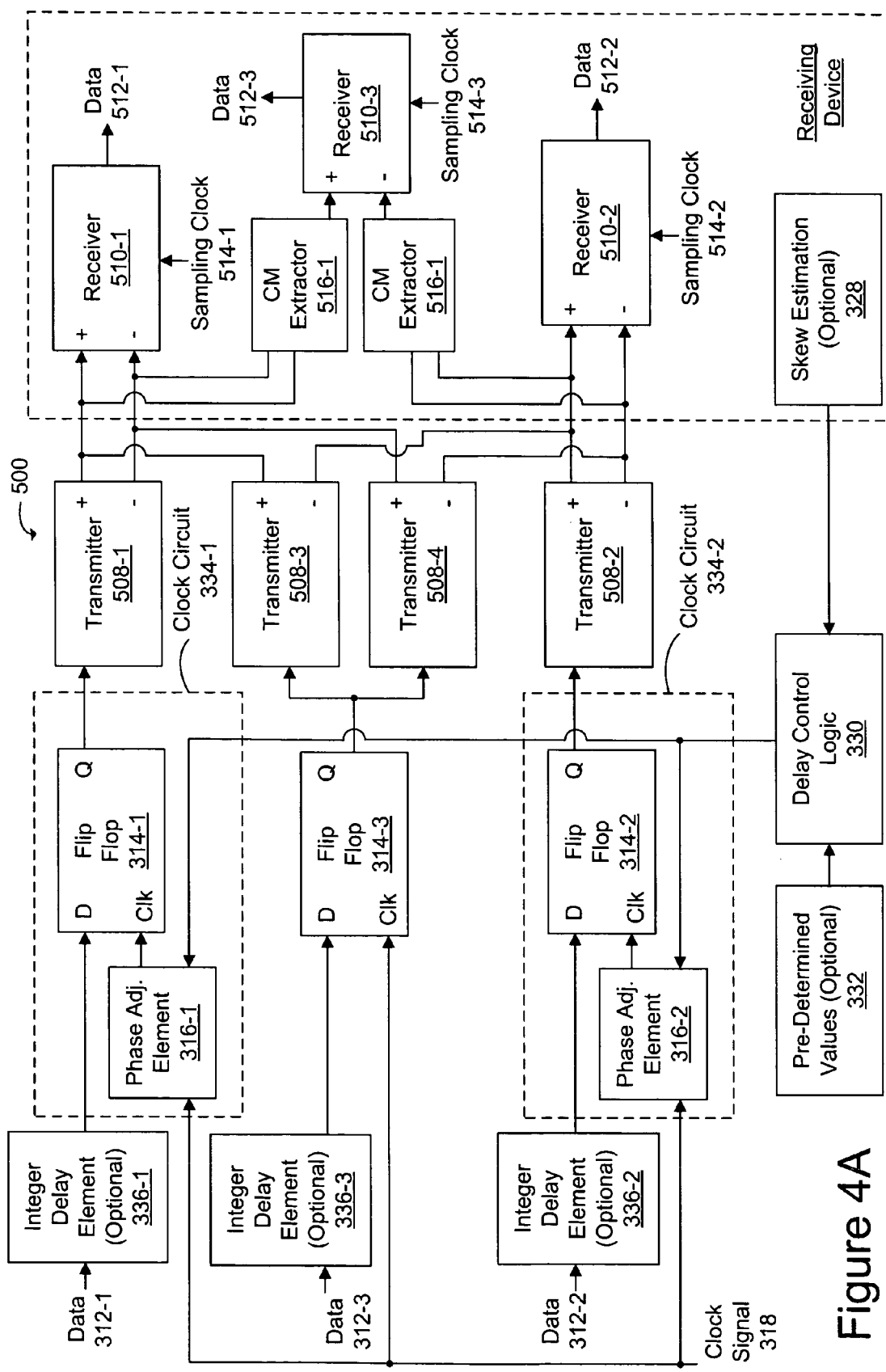
FIG. 4A is a block diagram illustrating an embodiment of a signaling system.
Figure 5:
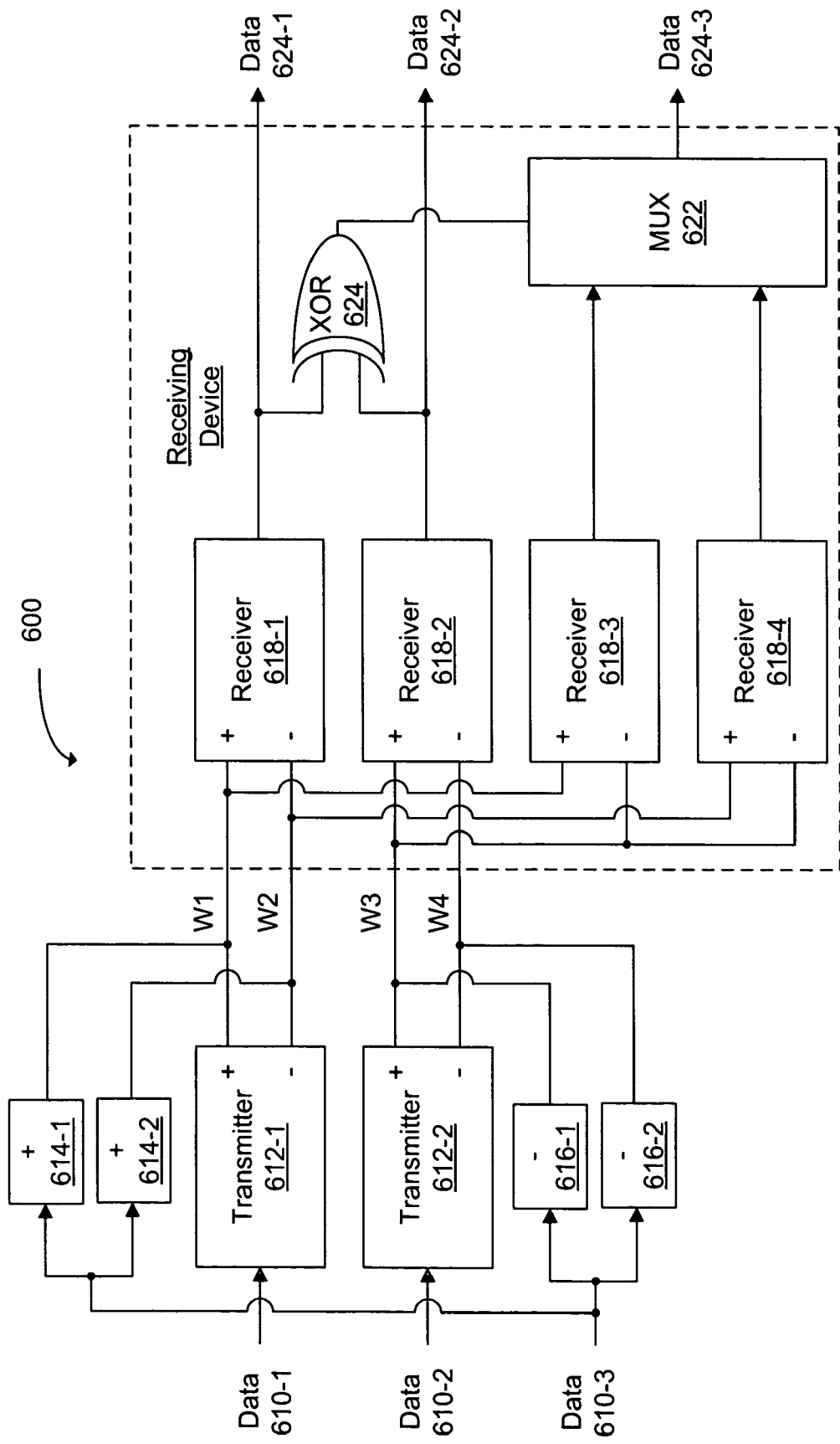
FIG. 5 is a block diagram illustrating an embodiment of a signaling system.
Figure 6:
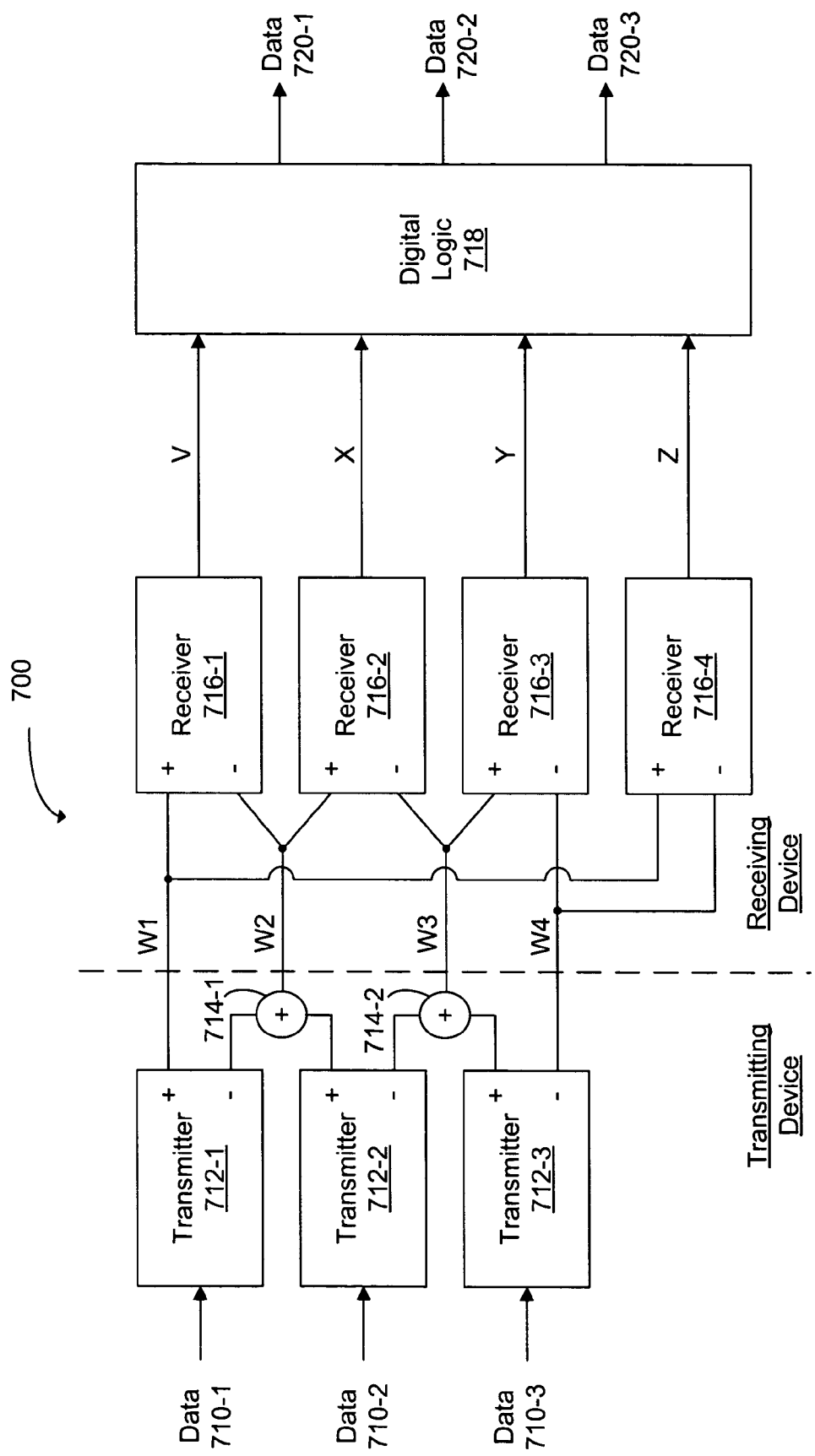
FIG. 6 is a block diagram illustrating an embodiment of a signaling system.
Figure 7:
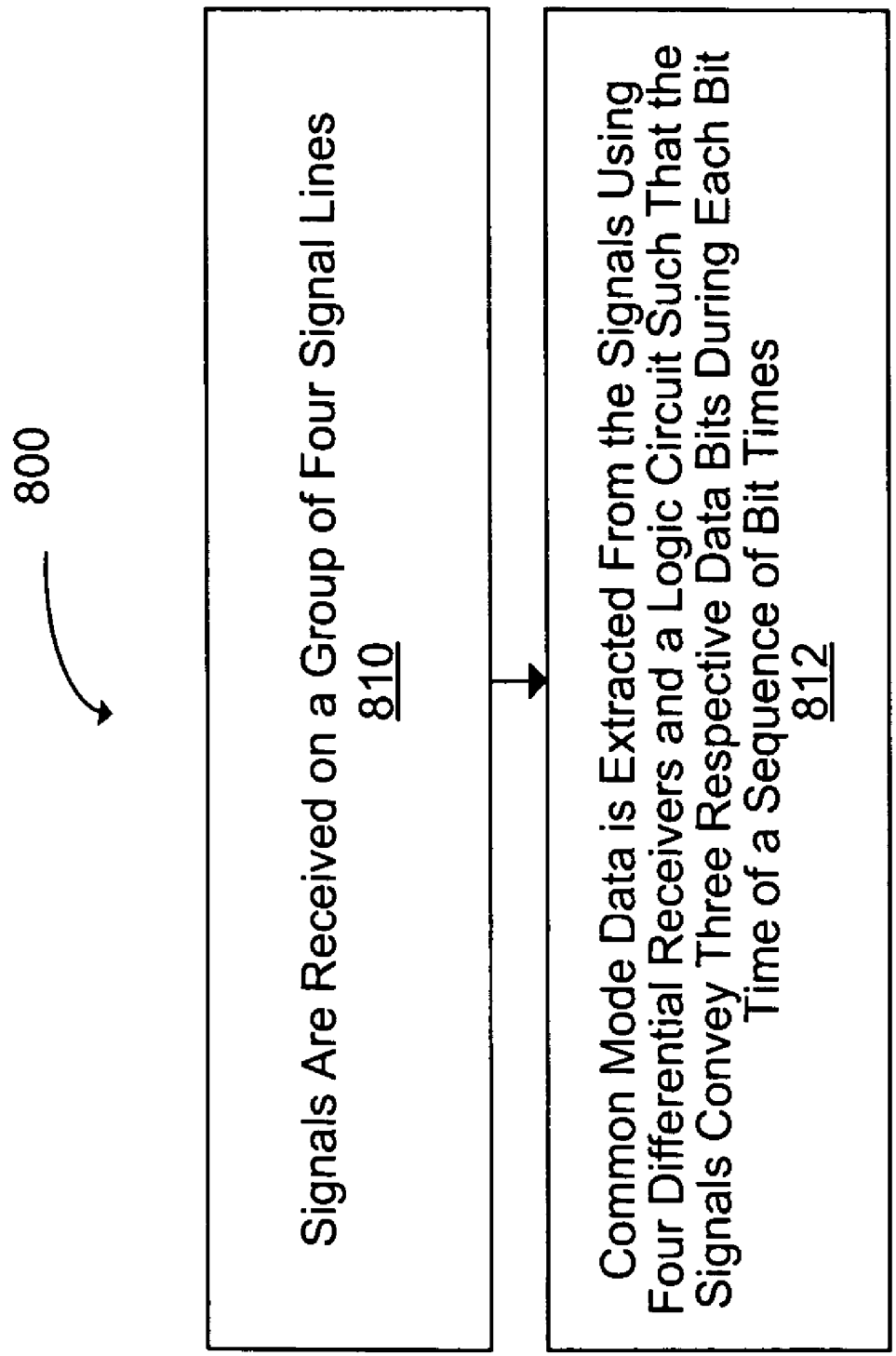
FIG. 7 is a flow diagram illustrating a method of operation of a receiver.

Compensation for timing offsets, in the transmitter and/or the receiver, may be implemented in conjunction with common-mode signaling, for example, with two pairs of signal lines. This is illustrated in FIGS. 5-7. FIG. 4A is a block diagram illustrating an embodiment of a signaling system 500. Data 312-1 may be coupled to optional integer delay element 336-1 and clock circuit 334-1. Data 312-2 may be coupled to optional integer delay element 336-2 and clock circuit 334-2. The clock circuits 334 may include flip-flops 314 and phase adjustment elements 316. The phase adjustment elements 316 may be coupled to clock signal 318. Outputs from the clock circuits 334 may be coupled to differential transmitters 508-1 and 508-2. Outputs from the transmitters 508-1 and 508-2, which are each differential signals, may be received by differential receivers 510-1 and 510-2 (in a receiving device) in accordance with sampling clocks 514. The sampling clocks 514 may be generated by an additional clocking circuit (not shown). The differential receivers 510-1 and 510-2 may output data 512-1 and 512-2, respectively. During a respective bit time, a bit in data 512-1 may correspond to a bit in a first sequence of bits in the data 312-1 and a bit in data 512-2 may correspond to a bit in a second sequence of bits in the data 312-2. Outputs from one or more of the differential receivers 510-1 and 510-2 may be coupled via an optional communications link or back channel (not shown) to optional skew estimation 328 circuitry. Delay control logic 330 may be coupled to an output from the optional skew estimation 328 circuitry and/or to optional pre-determined values 332.

The delay control logic 330 may adjust a respective transmit time of transmitter 508-1 and/or differential transmitter 508-2 by adjusting phase adjustment element 316-1 and/or phase adjustment element 316-2. In some embodiments, the delay control logic 330 may be used to adjusted one or more of the optional integer delay elements 336. The phase adjustment element 316-1 and/or phase adjustment element 316-2 may be used to adjust delay values that are less than the bit time in the sequence of bits corresponding to the data 312-1 and/or 312-2. If longer delay values are desired, optional integer delay element 336-1 and/or optional integer delay element 336-2 may be used to provide additional delays that are an integer multiple of the bit time in the sequence of bits. The optional integer delay elements 336 may be implemented using a first-in-first-out (FIFO) buffer or flip-flops.

The signaling system 500 may include data 312-3 coupled to optional integer delay element 336-3 and flip-flop 314-3. An output from the flip-flop 314-3 may be coupled to differential transmitters 508-3 and 508-4. Outputs from the differential transmitters 508-3 and 508-4, which may be common-mode signals, may be received using common-mode extractors 516 and differential receiver 510-3 in accordance with sampling clock 514-3. The common-mode extractors 516 may be analog circuits. The differential receiver 510-3 outputs data 512-3. During a respective bit time, a bit in data 512-3 corresponds to a bit in a third sequence of bits in the data 312-3. Thus, the signaling system 500 receives three data bits on four signal lines during each bit time in the sequence of bit times.

By adjusting transmit times of the differential transmitter 508-1, differential transmitter 508-2 and/or the differential transmitter 508-3, the signal system 500 may compensate for one or more timing offsets, such as intra-pair skew, between signals output from the differential transmitter 508-1, the differential transmitter 508-2 and/or the differential transmitter 508-3. In an exemplary embodiment, the signaling system 500 may compensate for intra-pair skew between common-mode signals output from the differential transmitters 508-3 and 508-4, and differential signals output from the differential transmitters 508-1 and/or 508-2.

The signaling system 500 may include fewer or additional components. For example, in some embodiments only one of the clock circuits 334 may have a phase adjustment element, such as the phase adjustment element 316-1. However, such embodiments may have difficulty in adjusting positive and negative relative timing offsets between signals output from the differential transmitter 508-1, the differential transmitter 508-2 and/or the differential transmitters 508-3 and 508-4. While the signaling system 500 is illustrated with four differential transmitters 508 and four signal lines, in other embodiments there may be one or more additional single-ended or differential transmitters and signal lines. In other embodiments, one or more of the differential transmitters 508 may be replaced by two or more single-ended transmitters. For example, there may be four single-ended transmitters and four signal lines. Clock circuits for each of the four single-ended transmitters may each have a corresponding phase adjustment element, such as the phase adjustment element 316-1. In some embodiments, there may be a phase adjustment element between the clock signal 318 and a clock input for the flip-flop 314-3. This phase adjustment element may be coupled to the delay control logic 330. In some embodiments, positions of one or more components may be changed. Two or more components may be combined into a single component. Functions of one or more components may be implemented using one or more other components.

Figure 4B:
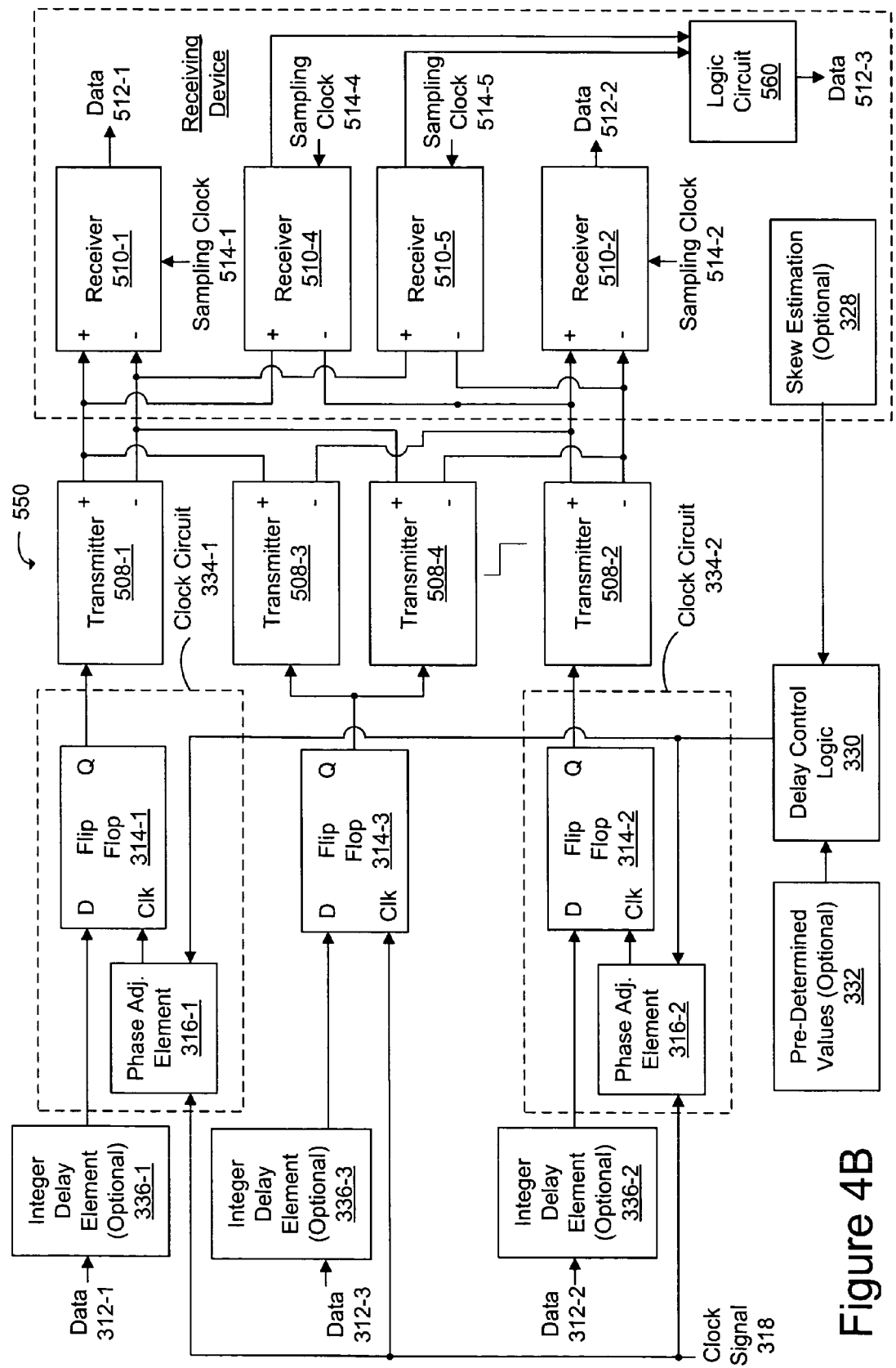
FIG. 4B is a block diagram illustrating an embodiment of a signaling system.

FIG. 4B is a block diagram illustrating an embodiment of a signaling system 550. As in signaling system 500, a receiving device in signaling system 550 receives three data bits on four signal lines during each bit time in the sequence of bit times. Only the portions of signaling system 550 that differ from signaling system 500 will be described. In the signaling system 550, the common-mode extractors 516 of system 500 have been removed. In their place, two differential receivers 510-4 and 510-5 in a receiving device receive outputs from the differential transmitters 508-3 and 508-4, which may be common-mode signals, in accordance with sampling clock 514-4 and 514-5. Outputs from the differential receivers 510-4 and 510-5 are coupled to a digital logic circuit 560, which outputs data 512-3. During a respective bit time, a bit in data 512-3 corresponds to a bit in the third sequence of bits in the data 312-3. While not shown, the logic circuit 560 may use a control signal determined using one or more of the outputs from the differential receivers 510-1 and 510-2.

The signaling system 550 may include fewer or additional components. While the signaling system 550 is illustrated with four differential transmitters 508 and four signal lines, in other embodiments there may be one or more additional single-ended or differential transmitters and signal lines. In other embodiments, one or more of the differential transmitters 508 may be replaced by two or more single-ended transmitters. For example, there may be four single-ended transmitters and four signal lines. Clock circuits for each of the four single-ended transmitters may each have a corresponding phase adjustment element, such as the phase adjustment element 316-1. In some embodiments, there may be a phase adjustment element between the clock signal 318 and a clock input for the flip-flop 314-3. This phase adjustment element may be coupled to the delay control logic 330. In some embodiments, positions of one or more components may be changed. Two or more components may be combined into a single component. Functions of one or more components may be implemented using one or more other components.

FIG. 5 is a block diagram illustrating an embodiment of a signaling system 600. Data 610-1 is coupled to a differential transmitter 612-1, and data 610-2 is coupled to another differential transmitter 612-2. Outputs from the transmitters 612-1 and 612-2, which are each differential signals, are timed in accordance with one or more transmit clocks (not shown). The one or more transmit clocks may be adjusted as illustrated in FIGS. 3-5. The outputs of transmitters 612-1, 612-2 may be received by differential receivers 618-1 and 618-2 (in a receiving device) in accordance with one or more sampling clocks (not shown). The one or more sampling clocks may be adjusted as illustrated in FIGS. 4A and 4B. The differential receivers 618-1 and 618-2 output data 624-1 and 624-2, respectively. During a respective bit time, a bit in data 624-1 corresponds to a bit in the first sequence of bits in the data 610-1 and a bit in data 624-2 corresponds to a bit in the second sequence of bits in the data 610-2. While not shown in the signaling system 600, in some embodiments there may optionally be a communications channel or back channel 326 (FIG. 2A), skew estimation circuitry 328 (FIG. 2A), delay control logic 330 (FIG. 2A), and/or pre-determined values 332. In some embodiments, the differential transmitters 612 may be replaced with single-ended transmitters.

The signaling system 600 may include data 610-3 coupled to drivers 614 and 616. Outputs from the drivers 614 and 616, which are common-mode signals, may be timed in accordance with one or more transmit clocks (not shown). The one or more transmit clocks may be adjusted as illustrated in FIGS. 3-5. The outputs from the drivers 614 and 616 may be received by differential receivers 618-3 and 618-4 in conjunction with multiplexer 622. The multiplexer 622 may utilize a control signal generated by a logic circuit, such as XOR 624, based on the outputs from the differential receivers 618-1 and 618-2. The multiplexer 622 may output data 624-3. During a respective bit time, a bit in data 624-3 corresponds to a bit in the third sequence of bits in the data 610-3. As a result, the receiving device in the signaling system 600 receives three data bits on four signal lines during each bit time in the sequence of bit times.

While the signaling system 600 illustrates a configuration for receiving three data bits on four signal lines during each bit time in the sequence of bit times, other configurations may be used in other embodiments. For example, in the signaling system 600 the differential receivers 618-3 and 618-4 use W1 and W3, and W2 and W3, respectively, as inputs. In an alternate embodiment, the differential receivers 618-3 and 618-4 may use W2 and W3, and W2 and W4, respectively, as inputs. While the signaling system 600 illustrates extracting common-mode data from signals on a group of four signal lines using outputs from four differential receivers 618 in conjunction with the multiplexer 622, in other embodiments the common-mode data may be extracted using only the outputs from the four differential receivers 618.

Tables I-III illustrate an exemplary embodiment of signals in the signaling system 600. While Tables I-III use a particular coding set as an illustration, in other embodiments different coding sets may be used. For example, Table I uses 1 and −1. In other embodiments 0 and 1 may be used. Table I illustrates bits in the first, second and third sequences of bits (which may alternately be called data values or data symbols). Table II illustrates levels corresponding to signals output on signal lines W1, W2, W3 and W4. Table III illustrates outputs from the differential receivers 618. The outputs from the differential receivers 618-1 and 618-2 correspond to the bits in the data 610-1 and 610-2, respectively. By selectively utilizing the outputs from the differential receivers 618-3 and 618-4 (for example, using the multiplexer 622 in conjunction with the control signal provided by the XOR 624), there is a correspondence with the bits in the data 610-3. In this example, during each bit time, the third data bit is recovered from the output of differential receiver 618-4 when the outputs of differential receivers 618-1 and 618-2 are equal, and otherwise the third data bit is recovered from the output of differential receiver 618-3. This is illustrated by the dashed circles.

TABLE I

Input bit values to transmitters and drivers in an embodiment of the signaling system.

| Data 610-1 | Data 610-2 | Data 610-3 |
|---|---|---|
| −1 | −1 | −1 |
| −1 | −1 | 1 |
| −1 | 1 | −1 |
| −1 | 1 | 1 |
| 1 | −1 | −1 |
| 1 | −1 | 1 |
| 1 | 1 | −1 |
| 1 | 1 | 1 |

TABLE II

Levels corresponding to signals on the signal lines in an embodiment of the signaling system.

| W1 | W2 | W3 | W4 |
|---|---|---|---|
| −1 | 0 | 0 | 1 |
| 0 | 1 | −1 | 0 |
| −1 | 0 | 1 | 0 |
| 0 | 1 | 0 | −1 |
| 0 | −1 | 0 | 1 |
| 1 | 0 | −1 | 0 |
| 0 | −1 | 1 | 0 |
| 1 | 0 | 0 | 1 |

TABLE III

Output bit values from receivers in an embodiment of the signaling system.

| Output from Receiver 618-1 | Output from Receiver 618-2 | Output from Receiver 618-3 | Output from Receiver 618-4 |
|---|---|---|---|
| −1 | −1 | 0 | −1 |
| −1 | −1 | 2 | 1 |
| −1 | 1 | −1 | 0 |
| −1 | 1 | 1 | 2 |
| 1 | −1 | −1 | −2 |
| 1 | −1 | 1 | 0 |
| 1 | 1 | −2 | −1 |
| 1 | 1 | 0 | 1 |

While one or more clock circuits, such as those illustrated in FIGS. 3-5, are not shown in the signaling system 600, adjustments to one or more clock circuits may allow the signaling system 600 to compensate for one or more timing offsets, such as intra-pair skew, between signals output from the differential transmitter 612-1, the differential transmitter 612-2 and/or the drivers 614 and 616. In an exemplary embodiment, the signaling system 600 may compensate for intra-pair skew between common-mode signals output from the drivers 614 and 616 and differential signals output from the differential transmitters 612-1 and/or 612-2.

One or more of the differential receivers 618 in the signaling system 600 may be binary receivers having a detection threshold of substantially zero. In some embodiments, one or more of the differential receivers 618 may be a multi-level receiver having at least one detection threshold that is different than 0. The differential transmitters 612 and/or drivers 614 and 616 may be implemented using a voltage-mode and/or a current-mode.

The signaling system 600 may include fewer or additional components. While the signaling system 600 is illustrated with two differential transmitters 612, two drivers 614, two drivers 616 and four signal lines, in other embodiments there may be one or more additional single-ended or differential transmitters, one or more additional drivers, and one or more signal lines. In other embodiments, one or more of the differential transmitters 612 may be replaced by two or more single-ended transmitters. In some embodiments, for example, there may be four single-ended transmitters and four signal lines. In some embodiments, positions of one or more components may be changed. Two or more components may be combined into a single component. Functions of one or more components may be implemented using one or more other components.

FIG. 6 is a block diagram illustrating an embodiment of a generalized signaling system 700. Data 710 may be coupled to a set of differential transmitters 712. Outputs from the differential transmitters 712, which may be differential signals, may be timed in accordance with one or more transmit clocks (not shown). The one or more transmit clocks may be adjusted as illustrated in FIGS. 3-5. Some of the outputs from the differential transmitters 712 may be combined using signal adders 714. The outputs and combined signals may be received by differential receivers 716 in a receiving device, using one or more sampling clocks (not shown). The one or more sampling clocks may be adjusted as illustrated in FIGS. 4A and 4B.

Outputs from the differential receivers 716 are coupled to digital logic 718. The digital logic 718 detects and/or determines bits corresponding to the data 710, which is output as data 720. During a respective bit time, a bit in data 720-1 corresponds to a bit in the first sequence of bits in the data 710-1, a bit in data 720-2 corresponds to a bit in the second sequence of bits in the data 710-2, and a bit in data 720-3 corresponds to a bit in the third sequence of bits in the data 710-3. The receiving device in signaling system 700 receives three data bits on four signal lines during each bit time in the sequence of bit times using, for example, common-mode signaling on at least two signal lines. While not shown in the signaling system 700, in some embodiments there may be a communications channel or back channel 326 (FIG. 2A), skew estimation circuitry 328 (FIG. 2A), delay control logic 330 (FIG. 2A), and/or pre-determined values 332. In some embodiments, the differential transmitters 712 may be replaced with single-ended transmitters.

Tables IV-VI illustrate an exemplary embodiment of signals in the signaling system 700. Table IV illustrates bits in the first, second and third sequences of bits. Table IV illustrates levels corresponding to signals output on signal lines W1, W2, W3 and W4. However, the signals on the four signal lines W1-W4 can be coded in many other ways in other embodiments. Table VI illustrates outputs V, X, Y and Z from the differential receivers 716. The outputs may be used by the digital logic 718 to detect or determine the data 720. For example, thresholding V may yield the data 710-1 and thresholding Y may yield the data 710-3. The thresholding may be implemented using hardware and/or software (for example, using a look-up table). Thresholding and multiplexing Z and X may yield the data 710-2. In some embodiments, a multi-level receiver may be used. In other embodiments, one or more of the differential transmitters 712 may have a different weight than the other differential transmitters 712.

TABLE IV

Input bit values to transmitters and drivers in an embodiment of the signaling system.

| Data 710-1 | Data 710-2 | Data 710-3 |
|---|---|---|
| −1 | −1 | −1 |
| −1 | −1 | 1 |
| −1 | 1 | −1 |
| −1 | 1 | 1 |
| 1 | −1 | −1 |
| 1 | −1 | 1 |
| 1 | 1 | −1 |
| 1 | 1 | 1 |

TABLE V

Levels corresponding to signals on the signal lines in an embodiment of the signaling system.

| W1 | W2 | W3 | W4 |
|---|---|---|---|
| −1/2 | 0 | 0 | 1/2 |
| −1/2 | 0 | 1 | −1/2 |
| −1/2 | 1 | −1 | 1/2 |
| −1/2 | 1 | 0 | −1/2 |
| 1/2 | −1 | 0 | 1/2 |
| 1/2 | −1 | 1 | −1/2 |
| 1/2 | 0 | −1 | 1/2 |
| 1/2 | 0 | 0 | −1/2 |

TABLE VI

Output bit values from receivers in an embodiment of the signaling system.

| V | X | Y | Z |
|---|---|---|---|
| −1/2 | 0 | −1/2 | −1 |
| −1/2 | −1 | 3/2 | 0 |
| −3/2 | 2 | −3/2 | −1 |
| −3/2 | 1 | 1/2 | 0 |
| 3/2 | −1 | −1/2 | 0 |
| 3/2 | −2 | 3/2 | 1 |
| 1/2 | 1 | −3/2 | 0 |
| 1/2 | 0 | 1/2 | 1 |

While one or more clock circuits, such as those illustrated in FIGS. 3-5, are not shown in the signaling system 700, adjustments to one or more clock circuits may allow the signaling system 700 to compensate for one or more timing offsets, such as intra-pair skew, between signals output from the differential transmitter 712. In an exemplary embodiment, the signaling system 700 may compensate for intra-pair skew between common-mode signals and differential signals output from the differential transmitters 712.

One or more of the differential receivers 716 in the signaling system 700 may be binary receivers having a detection threshold of substantially zero. In some embodiments, one or more of the differential receivers 716 may be a multi-level receiver having at least one detection threshold that is different than 0. The differential transmitters 712 and/or the signal adders 714 may be implemented using a voltage-mode and/or a current-mode.

The signaling system 700 may include fewer or additional components. While the signaling system 700 is illustrated with four differential transmitters 712 and four signal lines, in other embodiments there may be one or more additional single-ended or differential transmitters and/or one or more signal lines. In other embodiments, one or more of the differential transmitters 712 may be replaced by two or more single-ended transmitters. In some embodiments, for example, there may be six or more single-ended transmitters and four signal lines. In some embodiments, positions of one or more components may be changed. Two or more components may be combined into a single component. Functions of one or more components may be implemented using one or more other components.

Attention is now directed towards processes of using the embodiments of the signaling system. FIG. 7 is a flow diagram illustrating a method 800 of operation of a receiver. Signals are received on a group of four signal lines (810). Common-mode data is extracted from the signals using four differential receivers and a logic circuit such that the signals convey three respective data bits during each bit time of a sequence of bit times (812). In some embodiments, there may be fewer or additional operations, an order of the operations may be rearranged and/or two or more operations may be combined.

Figure 8:
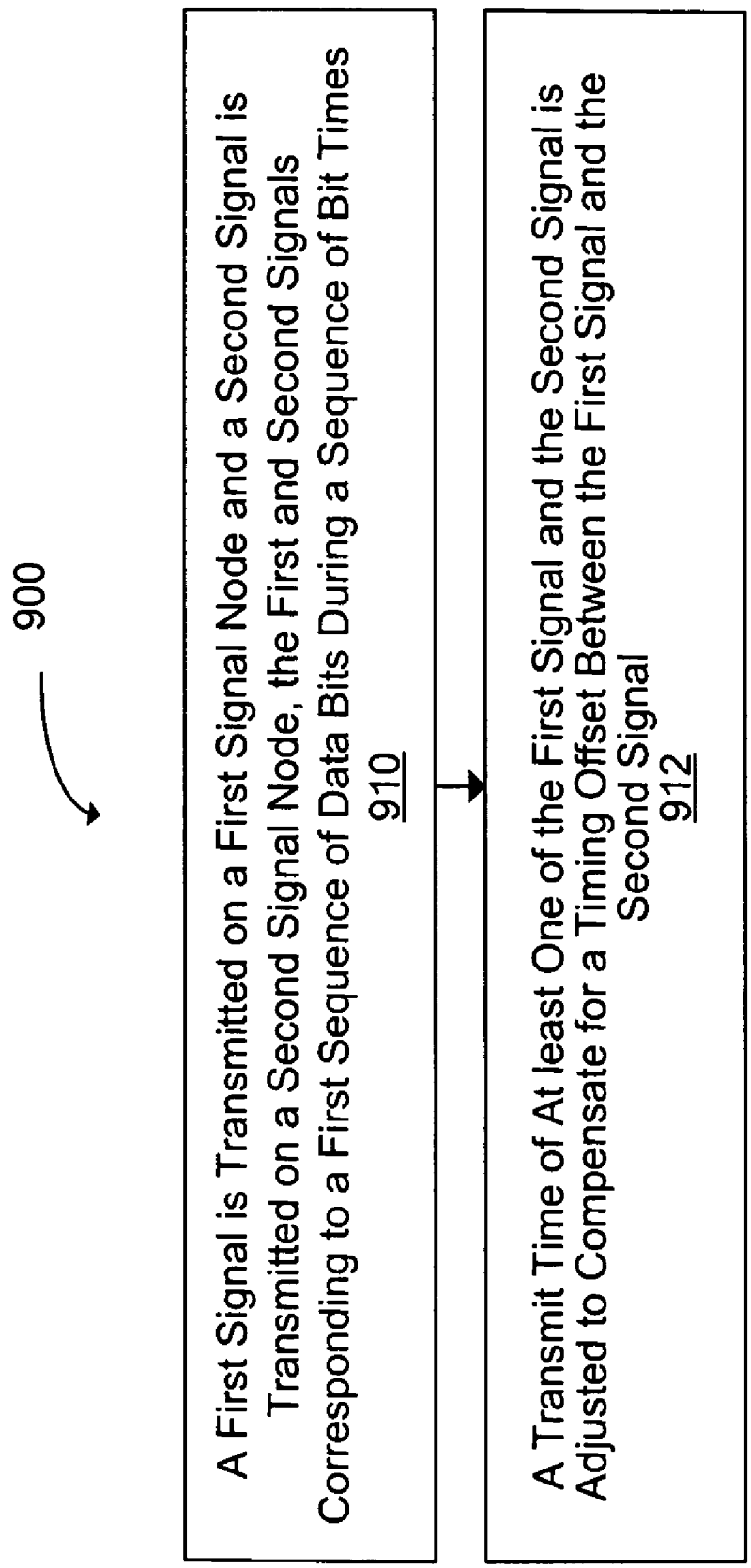
FIG. 8 is a flow diagram illustrating a method of operation of a transmitter.

FIG. 8 is a flow diagram illustrating a method 900 of operation of a transmitter. A first signal is transmitted on a first signal node and a second signal is transmitted on a second signal node, the first and second signals corresponding to a first sequence of data bits during a sequence of bit times (910). A transmit time of at least one of the first signal and the second signal is adjusted to compensate for a timing offset between the first signal and the second signal (912). In some embodiments, there may be fewer or additional operations, an order of the operations may be rearranged and/or two or more operations may be combined.

The embodiments of the signaling system may be applied in a variety applications, such as memory devices and systems, as well as communications systems, such as multi-tone systems or links where sub-channels corresponding to bands of frequencies are used to convey information. In some embodiments, multiple instances of components in the signal system may be utilized, for example, for each group of signal lines in a communications link, interconnect, interface, bus, back plane, or a respective sub-channels in the multi-tone system. The signaling system may correspond to inter-chip communication, such as between one or more semiconductor chips or dies, or to communication within a semiconductor chip, also known as intra-chip communication, such as between modules in an integrated circuit.

The signaling system and its methods of operation are well-suited for use in improving communication in memory systems and devices. They are also well-suited for use in improving communication between a memory controller chip and one or more memory devices or modules, such as a dynamic random access memory (DRAM) chip. The DRAM chip may be either on the same printed circuit board as the controller or embedded in a memory module. The apparatus and methods described herein may also be applied to other memory technologies, such as static random access memory (SRAM) and electrically erasable programmable read-only memory (EEPROM).

Devices and circuits described herein can be implemented using computer aided design tools available in the art, and embodied by computer readable files containing software descriptions of such circuits, at behavioral, register transfer, logic component, transistor and layout geometry level descriptions stored on computer readable storage media. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Physical files can be implemented on machine readable media such as 4 mm magnetic tape, 8 mm magnetic tape, floppy disk media, hard disk media, CDs, DVDs, and so on.

Figure 9:
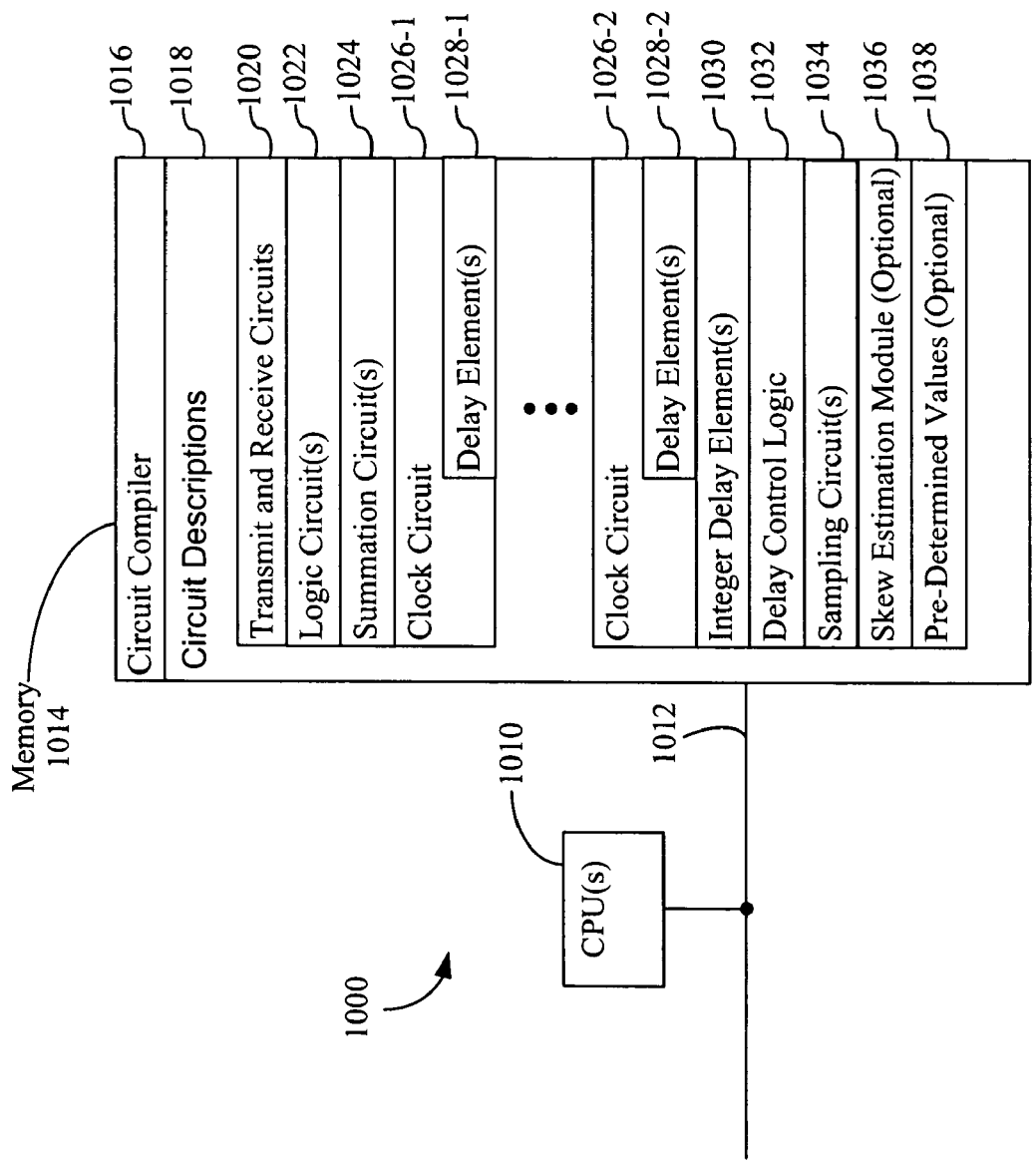
FIG. 9 is a block diagram illustrating an embodiment of a system.

FIG. 9 is a block diagram illustrating an embodiment of a system 1000 for storing computer readable files containing software descriptions of the circuits. The system 1000 may include at least one data processor or central processing unit (CPU) 1010, a memory 1014 and one or more signal lines 1012 for coupling these components to one another. The one or more signal lines 1012 may constitute one or more communications buses.

The memory 1014 may include high-speed random access memory and/or non-volatile memory, such as one or more magnetic disk storage devices. The memory 1014 may store a circuit compiler 1016 and circuit descriptions 1018. The circuit descriptions 1018 may include transmit and receive circuits 1020, logic circuit(s) 1022, summation circuit(s) 1024, clock circuit(s) 1026, integer delay elements(s) 1030, delay control logic 1032, sampling circuit(s) 1034, optional skew estimation module 1036 and optional pre-determined values 1038. Each instance of the clock circuit(s) 1026 may include phase adjustment element(s) 1028. The circuit descriptions 1018 may include descriptions of additional circuits, and in some embodiments may include only a subset of the circuit descriptions shown in the system 1000.

Attention is now directed towards several embodiments of a four wire signaling system. In one embodiment, a signaling device is described. The signaling device may include a group of four signal nodes, four differential receivers and a logic circuit. The group of four signal nodes may receive a sequence of data bits during a sequence of bit times. A respective differential receiver of the four differential receivers may be coupled to two respective signal nodes in the group of four signal nodes. The logic circuit may extract common-mode data from signals on the group of four signal nodes using outputs from the four differential receivers such that three data bits are received on the group of four signal nodes during each bit time of the sequence of bit times.

The four signal nodes may be arranged into a first pair of signal nodes and a second pair of signal nodes. A first differential receiver in the four differential receivers may be coupled to the first pair of signal nodes and a second differential receiver in the four differential receivers may be coupled to the second pair of signal nodes. An output from the first differential receiver may correspond to a first bit in the three data bits and an output from the second differential receiver may correspond to a second bit in the three data bits. A third differential receiver in the four differential receivers may be coupled to a first signal node in the first pair of signal nodes and a second signal node in the second pair of signal nodes. A fourth differential receiver in the four differential receivers may be coupled to a third signal node in the first pair of signal nodes and the second signal node in the second pair of signal nodes.

The four signal nodes may be arranged into a first pair of signal nodes and a second pair of signal nodes. A control signal may be determined from the output of the first differential receiver and the output of the second differential receiver. The control signal may be coupled to the logic circuit.

In some embodiments, the four differential receivers may be binary receivers having a detection threshold of substantially zero. In some embodiments, one or more of the four differential receivers may be a multi-level receiver having at least one detection threshold that is different than 0.

In some embodiments, the first signal node and the second signal node may be coupled to the first differential receiver in the four differential receivers, the second signal node and the third signal node may be coupled to the second differential receiver in the four differential receivers, the third signal node and a fourth signal node may be coupled to the third differential receiver in the four differential receivers, and the first signal node and the fourth signal node may be coupled to a fourth differential receiver in the four differential receivers. Outputs from two of the four differential receivers may be used to determine a single one of the three bits.

In some embodiments, the signaling device may include a group of four signal lines coupled to the group of four signal nodes and a transmitter coupled to the group of four signal lines. The transmitter may differentially drive signals corresponding to the first bit in the three bits on a first pair of signal lines in the four signal lines, may differentially drive signals corresponding to the second bit in the three bits on a second pair of signal lines in the four signal lines, and may differentially drive signals corresponding to a third bit in the three bits as the common mode data on the first pair of signal lines and the second pair of signal lines.

In some embodiments, the transmitter may include three differential driver circuits. One of the three differential drivers may have a substantially different output amplitude than other differential drivers.

Clock circuits for two of the three differential drivers may include respective phase adjustment elements. The respective phase adjustment elements may provide compensation for a timing offset between first signals on the first pair of signal lines and second signals on the second pair signal lines that is less than a bit time. The compensation may substantially align the signals corresponding to the first, second and third bits. Data input lines for the two of the three differential drivers may include respective integer delay elements. The respective integer delay elements may provide delays corresponding to an integer multiple of the bit time.

In some embodiments, the signaling device may include delay control logic. The delay control logic may adjust the respective phase adjustment elements for one or more of the clock circuits in accordance with outputs from one or more of the four differential receivers.

In some embodiments, the transmitter may include at least six single-ended drivers. Clock circuits for at least three of the single-ended drivers may include respective phase adjustment elements. The respective phase adjustment elements may provide compensation for timing offsets between signals on the group of four signal lines that are less than the bit time.

Data input lines for at least three of the single-ended drivers may include respective integer delay elements. The respective integer delay elements may provide delays corresponding to an integer multiple of the bit time.

The signaling device may reduce or eliminate the aforementioned challenges associated with intra-pair skew and common-mode signaling.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An integrated circuit device to compensate for intra-pair skew, the integrated circuit device comprising:
   a signal pair, including a first signal node and a second signal node, for transmitting signals from the integrated circuit device to another device;
   a transmitter coupled to the signal pair to transmit a first data signal on the first signal node and a second data signal on the second signal node, wherein a combination of the first data signal and the second data signal corresponds to a first sequence of data bits during a sequence of bit times; and
   a first clock circuit coupled to the transmitter to control a transmit time of the first data signal with respect to the second data signal, wherein the first clock circuit includes a first phase adjustment element that provides intra-pair skew compensation for a first timing offset between the first data signal and the second data signal, wherein the first timing offset comprises intra-pair skew and is less than a bit time in the sequence of bit times.

2. The device of claim 1, wherein the first phase adjustment element is configured to reduce a phase mismatch between the first data signal and the second data signal at a receiver.

3. The device of claim 1, wherein the transmitter includes a first single-ended driver circuit coupled to the first signal node and a second single-ended driver circuit coupled to the second signal node, and wherein the first clock circuit is coupled to the first single-ended driver circuit.

4. The device of claim 3, wherein a data input line of the first single-ended driver circuit includes an integer delay element, the integer delay element providing delays corresponding to an integer multiple of the bit time.

5. The device of claim 3, further comprising a second clock circuit coupled to the second single-ended driver to control a transmit time of the second data signal, wherein the second clock circuit includes a second phase adjustment element.

6. The device of claim 3, wherein a data input line of the second single-ended driver circuit includes an integer delay element, the integer delay element providing delays corresponding to an integer multiple of the bit time.

7. The device of claim 3, further comprising a second clock circuit, wherein the transmitter further includes a third single-ended driver circuit coupled to a third signal node to transmit a third data signal and a fourth single-ended driver circuit coupled to a fourth signal node to transmit a fourth data signal, the third data signal and the fourth data signal correspond to a second sequence of data bits during the sequence of bit times, the second clock circuit is coupled to the third single-ended driver, and wherein the second clock circuit includes a second phase adjustment element to provide compensation for a second timing offset between the third data signal and the fourth data signal.

8. The device of claim 7, wherein a data input line of the third single-ended driver circuit includes an integer delay element, the integer delay element providing delays corresponding to an integer multiple of the bit time.

9. The device of claim 7, further comprising a third clock circuit coupled to the fourth single-ended driver to control a transmit time of the fourth data signal, wherein the third clock circuit includes a third phase adjustment element.

10. The device of claim 7, wherein a data input line of the fourth single-ended driver circuit includes an integer delay element, the integer delay element providing delays corresponding to an integer multiple of the bit time.

11. The device of claim 7, wherein additional single-ended driver circuits in the transmitter differentially drive common mode signals corresponding to a third sequence of data bits during the sequence of bit times on a first pair of signal nodes and a second pair of signal nodes, and wherein the first pair of signal nodes includes the first signal node and the second signal node, and the second pair of signal nodes includes the third signal node and the fourth signal node.

12. The device of claim 11, further comprising:
   a third phase adjustment element to provide compensation for a third timing offset associated with transmission of the common mode signals on the first pair of signal nodes; and
   a fourth phase adjustment element to provide compensation for a fourth timing offset associated with transmission of the common mode signals on the second pair of signal nodes,
   wherein the third timing offset and the fourth timing offset are both less than the bit time.

13. A system to compensate for intra-pair skew, the system comprising:
   a signal pair, including a first signal node and a second signal node;
   a transmitter coupled to the signal pair to transmit a first data signal on the first signal node and a second data signal on the second signal node, wherein a combination of the first data signal and the second data signal corresponds to a first sequence of data bits during a sequence of bit times;

a first clock circuit coupled to the transmitter to control a transmit time of the first data signal with respect to the second data signal, wherein the first clock circuit includes a first phase adjustment element that provides intra-pair skew compensation for a first timing offset between the first data signal and the second data signal, wherein the first timing offset comprises intra-pair skew and is less than a bit time in the sequence of bit times; and a receiver, including at least one differential receiver, coupled to the signal pair, wherein the receiver receives the first data signal and the second data signal.

14. The system of claim 13, further comprising a logic circuit, wherein the receiver includes four differential receivers, each of the four differential receivers receives a respective signal pair each including a respective first and second data signal, and the logic circuit extracts the differentially driven common mode signals from outputs of the four differential receivers such that three data bits are received on the signal pairs during each bit time in the sequence of bit times.

15. The system of claim 13, further comprising delay control logic, wherein the delay control logic adjusts at least the first phase adjustment element in accordance with an output from the differential receiver.

16. The system of claim 13, further comprising a second clock circuit for controlling a sampling time of the differential receiver.

17. The system of claim 13, further comprising a communications link from the receiver to the transmitter, wherein the communications link provides feedback information.

18. The system of claim 13, wherein the receiver includes a second phase adjustment element to adjust a sampling time of the receiver, and to thereby adjust a receive time of the first data signal and the second data signal.

19. A method for correcting a timing offset to compensate for intra-pair skew, the method comprising:

transmitting from one device to another device a first data signal on a first signal node and a second data signal on a second signal node, wherein a combination of the first data signal and the second signal data corresponds to a first sequence of data bits during a sequence of bit times; and adjusting a transmit time of the first data signal with respect to the second data signal to compensate for a timing offset between the first data signal and the second data signal, wherein the timing offset comprises intra-pair skew and is less than a bit time in the sequence of bit times.

20. The method of claim 19, further comprising reducing a phase mismatch between the first data signal and the second data signal at a receiver, wherein the reducing is performed using a phase adjustment element.

21. The method of claim 19, further comprising adjusting an integer delay element to providing a delay of at least one of the first data signal and the second data signal corresponding to an integer multiple of the bit time.

22. The method of claim 19, further comprising:

transmitting a third data signal on a third signal node and a fourth data signal on a fourth signal node, wherein a combination of the third data signal and the fourth data signal corresponds to a second sequence of data bits during a sequence of bit times; and adjusting a transmit time of at least one of the third data signal and the fourth data signal to compensate for a timing offset between the third data signal and the fourth data signal, wherein the timing offset is less than the bit time in the sequence of bit times.

23. An integrated circuit device to compensate for intra-pair skew, the integrated circuit device comprising:

a signal pair, including a first signal node and a second signal node, for transmitting signals from the integrated circuit device to another device;

means for transmitting a first data signal on the first signal node and a second data signal on the second signal node, wherein a combination of the first data signal and the second data signal corresponds to a sequence of data bits during a sequence of bit times; and means for compensating for a transmit timing offset between the first data signal and the second data signal, wherein the first timing offset comprises intra-pair skew and is less than a bit time in the sequence of bit times.

* * * * *

UNITED STATES PATENT AND TRADEMARK OFFICE
CERTIFICATE OF CORRECTION

PATENT NO. : 7,650,526 B2
APPLICATION NO. : 11/299073
DATED : January 19, 2010
INVENTOR(S) : Alon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 438 days.

Signed and Sealed this

Twenty-third Day of November, 2010

David J. Kappos
*Director of the United States Patent and Trademark Office*